United States Patent Office 3,077,972
Patented Feb. 19, 1963

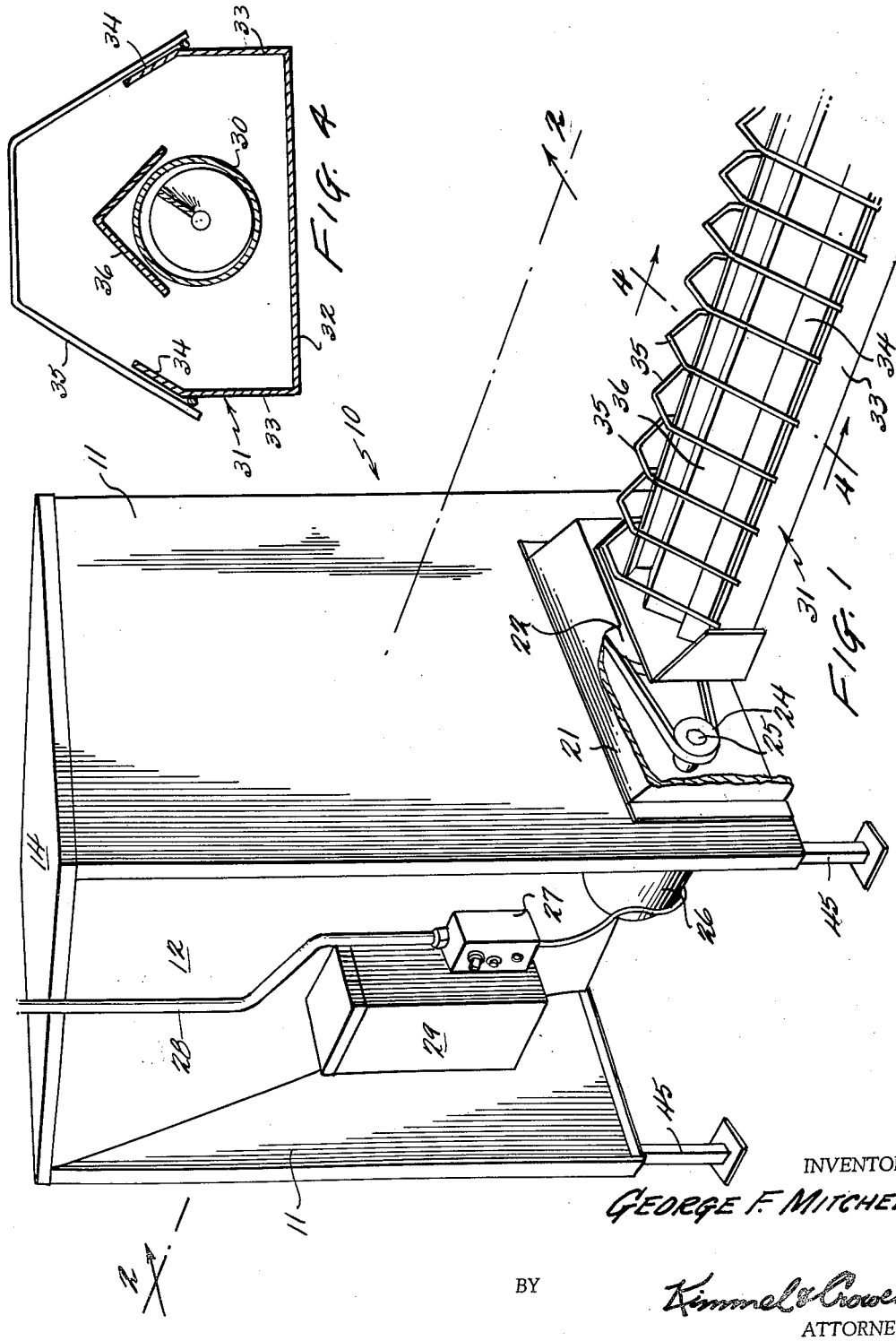

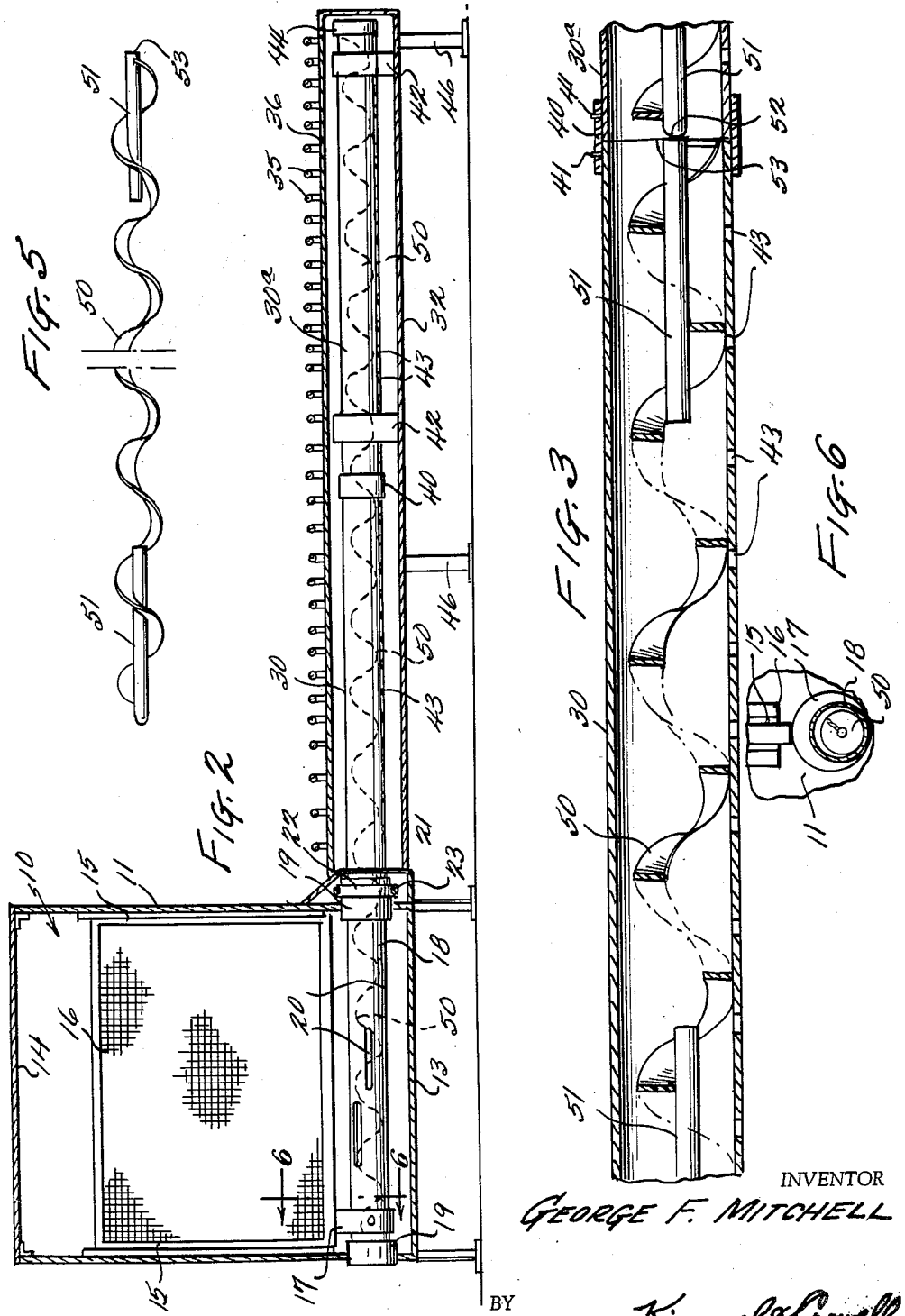

3,077,972
CONVEYOR
George F. Mitchell, Sidney, Ohio, assignor to Everyday Manufacturing Company, Sidney, Ohio, a corporation of Ohio
Filed May 12, 1961, Ser. No. 109,651
6 Claims. (Cl. 198—64)

This invention relates to a conveyor, and constitutes an improvement over my co-pending application, Serial No. 61,214 filed October 7, 1960, entitled "Conveyor."

A primary object of this invention is the provision of a helicoidal conveyor having a primary adaptation to use as a poultry feeder, but which may also be employed for the progressive conveyance of other granular material such as sand, cement, flour, feed in meal crumbled or pelleted forms, and feed in the form of an admixture of meal in whole or cracked grains or kernels or any of them separately.

A very important object of this invention is the provision of a conveyor of this character wherein there is provided a rotatable tube having openings therein for the dropping of feed or other material at selected intervals, and having positioned therein an open center feed helix, the latter being of lesser diameter than the tube, and freely rotatable therein, and adapted to be rotated by frictional engagement at the interior of the tube of the helix.

An additional object of the invention is the provision of a device of this nature wherein the helicoidal feeder, being smaller than the tube, turns at a faster rate than the tubing, which rate can be varied by varying the size of the helicoid relative to the size of the tubing, which slightly faster rotation causes the helicoid to scour and eliminate any deposits of dust or powder that ordinarily might build up on the walls of a tube as set forth in my previous application, wherein the helicoid was fixed to the inner wall of the tube and of the same diameter.

An additional object of the invention is the provision of a hopper in association with such a rotating tube, wherein agitating means are provided interiorly of the hopper adapted to be actuated by cams carried by the tube.

A further object of the invention is the provision of a device of this character which may be made in varying lengths, and wherein selected lengths of tubing are connected to provide a tube of any desired length.

Still another object of the invention is the provision of a device of this character wherein a plurality of sections of centerless helicoidal feeder coils may be loosely positioned interiorly of the rotatable tube, and wherein thrust rods are welded in each end of each coil section to prevent adjacent coils from intertwining during rotation.

Still another object of the invention is the provision of a device of this character which is sturdy and durable in construction, reliable and efficient in operation, and relatively simple and inexpensive to manufacture, assemble and utilize.

Other objects will in part be pointed out hereinafter and in part be shown in the accompanying drawing wherein there is disclosed a preferred embodiment of the instant inventive concept.

In the drawings:

FIGURE 1 is a perspective view of one form of poultry feeder, illustratively, including a hopper, and a feeder tube constructed in accordance with the instant invention, showing the drive mechanism therefor;

FIGURE 2 is a reduced longitudinal section taken substantially along the line 2—2 of FIG. 1, certain concealed portions of the apparatus being indicated in dotted lines;

FIGURE 3 is an enlarged view of the tubing shown in FIG. 2;

FIGURE 4 is an enlarged sectional view taken substantially along the line 4—4 of FIG. 1 as viewed in the direction indicated by the arrows;

FIGURE 5 is an elevational view, partially broken away, of one of the helicoidal feeder elements per se disassociated from its tube; and FIGURE 6 is a sectional view taken substantially along the line 6—6 of FIG. 2 as viewed in the direction indicated by the arrows.

Similar reference characters refer to similar parts throughout the several views of the drawing.

Having reference now to the drawings in detail, there is generally indicated at 10 a hopper for feed or the like which is comprised of a pair of oppositely disposed substantially rectangular end walls 11, between which are provided two downwardly converging side walls 12 forming a substantially V-shaped hopper having a relatively rounded bottom 13. A cover 14 is provided, which may be removed when it is desired to fill the hopper with feed or the like.

Centrally positioned interiorly of each end wall 11 is a vertically extending channel 15, which has mounted for reciprocation therein one end of a vertical screen 16 which serves as an agitator. The screen is agitated upwardly and downwardly in the channels 15 by means of a cam 17 which is mounted on a rotatable tubular element 18, which is journaled at its opposite ends 19 and suitable bushings in the lower extremities of the end wall. The tube is provided with a plurality of elongated pick-up slots 20 in order that upon rotation it may scoop up or pick up feed from the interior of the hopper 10 which is fed out of tube portion 18 in a manner to be more fully described hereinafter. A housing 21 is provided exteriorly of one end wall, and contains a pulley 22 which is fixedly secured to the projecting extremity of tube 18, and which is driven by a belt 23, the latter in turn being driven by a pulley 24 which is mounted on the drive shaft 25 of a suitable electric motor 26, which may be mounted on the exterior of one of the downwardly converging side walls 12. A suitable switch box 27 is provided, and current is supplied through a conduit 28 from any desired source. An auxiliary control box 29 is also provided and mounted on the side wall 12.

Extending outwardly from the end of tubular member 18 is a tubular extension 30, there being one or more provided as desired, which extension or tube seats in a trough generally indicated at 31, including a relatively flat bottom 32 and vertical shallow side walls 33 which are provided with inwardly converging flange portions 34 as best shown in FIG. 4. Wire guards 35 extend over the top of the trough, which is open between the projecting extremities of members 34 in such manner that a fowl may insert its head into the trough and obtain feed therefrom. An inverted V-shaped guard 36 covers rotatable tube 30, which is rotated by rotation of the tube section 18. The tube section 30 is connected to the tube section 18, or to an adjacent tube section 30a by means of a sleeve or collar 40, which is provided with an elongated slot therein for the accommodation of pins 41 carried by the opposite ends of the section, so as to provide a rotative connection between adjacent sections of the tube. Suitable supports 42 are provided at spaced intervals resting on the bottom 32 of the trough, as best shown in FIG 2 for supporting the tube sections 30 and 30a for rotation, and may take the form of the corresponding support shown in my above-mentioned co-pending application. The exterior parts of the tube 30 and 30a are provided at spaced intervals with openings 43, through which feed is dropped at selected spaced intervals along the length of the tube, and the outermost section, in this case 30a, is closed by an end cap 44, which rotates with the tube section.

Suitable supports 45 are provided for hopper 10 and similar supports 46 are provided for the trough 31 at suitable spaced intervals therealong, such supports being of any desired form, and may take the form of the support shown in my above-mentioned co-pending application.

Positioned interiorly of tubular sections 18, 30, and 30a are a plurality of helicoidal coil feed members 50, each of which has a hollow center, and each of which is mounted freely for rotation interiorly of its associated tubular section. At each end of each helicoidal member 50 there is provided a thrust pin 51 centrally located, one of which is provided with a rounded extremity 52 which abuts the squared off extremity 53 of the opposite pin, the arrangement being such that by their abutment the associated thrust pins prevent adjacent sections of the coil from intertwining with each other as they are rotated. The helices are freely rotatable within their associated tube sections, and they are of smaller diameter, the arrangement being such that upon rotation of the tubular section in a manner previously described the helices are simultaneously rotated, in a manner similar to that effected by an internal ring gear, so that feed is progressively moved from the hopper towards the closed end of the tube section, and exits through the openings 43 into the trough 31.

The relative speed of rotation of the helices may be varied by variation in the relative size of the tubing, and its associated internal coil, but it will be seen that an effective and continuous feed is provided by virtue of the above arrangement. Similarly, due to the semi-resiliency of the coil members, it is to be understood that there is a continuous mild scraping action along the interior of the tubular sections which prevents any accumulation of dust or powder interiorly of the feed tube.

Obviously, the length of the device may be as long as desired and practicable, and, if desired, a further section wherein the helices are reversed may be positioned on the opposite end of tube section 18, so that feed may be moved in both directions from the hopper.

From the foregoing it will now be seen that there is herein provided an improved conveyor which accomplishes all the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative, and not in a limiting sense.

1. In a conveyor, the combination of a driven rotatable tube having dispensing openings therein and an open center helical feed member loosely positioned in said tube in engagement with a portion of the wall thereof and rotatable relative thereto upon rotation of said tube.

2. In a conveyor, the combination of a driven rotatable tube having dispensing openings therein and an open center helical feed member loosely positioned in said tube in engagement with a portion of the wall thereof, and drive means for rotating said tube whereby friction between the interior of said tube and said helical feed member rotates the same, the rate of rotation of said helical feed member being greater than the rate of rotation of said tube.

3. In a conveyor, the combination of a driven rotatable tube having dispensing openings therein and an open center helical feed member loosely positioned in said tube in engagement with a portion of the wall thereof, and drive means for rotating said tube whereby friction between the interior of said tube and said helical feed member rotates the same, said helical feed member being of lesser diameter than said tube and having a greater rate of rotation.

4. The structure of claim 3 wherein a plurality of tube sections are connected for simultaneous rotation and a plurality of helical feed members are positioned therein, each open center helical feed member having a thrust pin in each end thereof, said thrust pins in abutting axial relation to each other to preclude intertwining of said members.

5. The structure of claim 4 wherein a hopper is provided at one end of said rotatable tube into which said end extends, said end being provided with elongated material receiving slots, an agitator in said hopper, and means carried by said tube for actuating said agitator.

6. The structure of claim 4 wherein a hopper is provided at one end of said rotatable tube into which said end extends, said end being provided with elongated material receiving slots, an agitator in said hopper, means carried by said tube for actuating said agitator, said agitator comprising a vertically movable screen and said means for actuating said agitator comprising a cam on said tube engageable with said screen.

References Cited in the file of this patent

UNITED STATES PATENTS

| | | |
|---|---|---|
| 827,579 | Straub | July 31, 1906 |
| 2,630,906 | Philipp | Mar. 10, 1953 |
| 2,933,175 | Gray | Apr. 19, 1960 |
| 3,001,633 | Heitshu | Sept. 26, 1961 |

FOREIGN PATENTS

| | | |
|---|---|---|
| 522,067 | Great Britain | June 7, 1940 |